(12) United States Patent
Ho

(10) Patent No.: US 9,251,532 B2
(45) Date of Patent: Feb. 2, 2016

(54) METHOD AND APPARATUS FOR PROVIDING SEARCH CAPABILITY AND TARGETED ADVERTISING FOR AUDIO, IMAGE, AND VIDEO CONTENT OVER THE INTERNET

(75) Inventor: Edwin Ho, Palo Alto, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 775 days.

(21) Appl. No.: 12/973,737

(22) Filed: Dec. 20, 2010

(65) Prior Publication Data

US 2011/0087549 A1   Apr. 14, 2011

Related U.S. Application Data

(63) Continuation of application No. 12/605,796, filed on Oct. 26, 2009, now Pat. No. 7,856,358, which is a continuation of application No. 11/490,798, filed on Jul. 20, 2006, now Pat. No. 7,620,551.

(51) Int. Cl.
| | |
|---|---|
| G10L 21/00 | (2013.01) |
| G06Q 30/00 | (2012.01) |
| G06Q 30/02 | (2012.01) |
| G06F 17/30 | (2006.01) |
| G10L 15/26 | (2006.01) |

(52) U.S. Cl.
CPC ...... *G06Q 30/0267* (2013.01); *G06F 17/30746* (2013.01); *G06F 17/30749* (2013.01); *G06F 17/30793* (2013.01); *G06F 17/30796* (2013.01); *G06F 17/30817* (2013.01); *G06Q 30/02* (2013.01); *G10L 15/26* (2013.01)

(58) Field of Classification Search
None
See application file for complete search history.

(56) References Cited

U.S. PATENT DOCUMENTS

| | | | |
|---|---|---|---|
| 5,729,741 A | 3/1998 | Liaguno et al. | |
| 5,794,249 A | 8/1998 | Orsolini et al. | |
| 6,345,252 B1 | 2/2002 | Beigi et al. | |
| 6,404,856 B1 | 6/2002 | Wilcox et al. | |
| 6,434,520 B1 | 8/2002 | Kanevsky et al. | |
| 6,907,397 B2 | 6/2005 | Kryze et al. | |
| 7,283,841 B2 | 10/2007 | Luke | |
| 7,769,764 B2 * | 8/2010 | Ramer et al. | 707/751 |
| 7,877,387 B2 * | 1/2011 | Hangartner | 707/736 |
| 2006/0248209 A1 | 11/2006 | Chiu et al. | |
| 2007/0078708 A1 * | 4/2007 | Yu et al. | 705/14 |
| 2007/0078712 A1 | 4/2007 | Ott et al. | |
| 2007/0106760 A1 | 5/2007 | Houh et al. | |
| 2007/0276726 A1 | 11/2007 | DiMatteo | |
| 2008/0046320 A1 | 2/2008 | Farkas et al. | |

OTHER PUBLICATIONS

International Search Report, PCT/US07/16451, Sep. 17, 2008.
Written Opinion, PCT/US07/16451, Sep. 17, 2008.

* cited by examiner

*Primary Examiner* — Brian Albertalli
(74) *Attorney, Agent, or Firm* — Sughrue Mion, PLLC

(57) ABSTRACT

The present invention provides an apparatus and method for extracting the content of a video, image, and/or audio file or podcast, analyzing the content, and then providing a targeted advertisement, search capability and/or other functionality based on the content of the file or podcast.

33 Claims, 3 Drawing Sheets

METHOD AND APPARATUS FOR PROVIDING SEARCH CAPABILITY AND TARGETED ADVERTISING FOR AUDIO, IMAGE, AND VIDEO CONTENT OVER THE INTERNET

PRIORITY CLAIM/RELATED APPLICATIONS

This application is a continuation of and claims priority under 35 USC 120 to U.S. patent application Ser. No. 12/605,796 filed on Oct. 26, 2009 and entitled "Method and Apparatus for Providing Search Capability and Targeted Advertising for Audio, Image, and Video Content Over the Internet," which is a continuation of U.S. patent application Ser. No. 11/490,798 filed on Jul. 20, 2006 and issued on Nov. 17, 2009 as U.S. Pat. No. 7,620,551, and entitled "Method and Apparatus for Providing Search Capability and Targeted Advertising for Audio, Image, and Video Content over the Internet," each of which is incorporated herein in their entirety by reference.

FIELD OF THE INVENTION

The present invention relates to extracting and analyzing the content of audio, image, and/or video data associated with Internet downloads, Internet podcasts or other digital distribution channels, producing descriptive data concerning that content, and then performing an action that utilizes the descriptive data, such as providing targeted advertising or a search capability.

BACKGROUND OF THE INVENTION

The Internet is increasingly being populated with audio, image, and video content. Server storage capacity and user bandwidth continues to increase and many websites now contain a wealth of audio, image, and video content, including music, photographs, and movies. Audio and video content can be streamed over the Internet or downloaded by a user. Another popular means of obtaining audio and video content is through the use of "podcasts." This term was coined after Apple Computer, Inc. introduced its iPod™ product. The iPod™ devices, certain cellphone handsets, and other handheld devices are capable of connecting to a server over the Internet to receive podcasts. A podcast is an automatic downloading of audio and/or video content over the Internet, sometimes as part of a subscription to the content. For example, a user can subscribe to a television or radio program through a website and have the television or radio program downloaded automatically when the user connects his or her unit to the network.

In another field, text searching and intelligent search engines for the Internet are widespread. Many search engines (e.g., Google™) allow the user to enter keywords (e.g., "lawnmowers") and the search engine then searches for content based on those keywords by searching for the search terms themselves and/or or by searching for concepts that are related to the search terms. However, in the past, these searches were performed on databases created only from textual data available on the Internet. Audio, image, and video content were not included within these searches, unless they were associated with text that was created by a human being for that content (e.g., a textual title for a photograph).

In another field, advertising over the Internet is widespread. Advertising can be targeted to certain topics in which a user is likely to be interested. For instance, many websites that provide a search engine will send ads to the user based on the content of the search entered by the user. As an example, a user who searches for "lawnmowers" through a search engine might be provided with links to websites offering lawnmowers for sale.

To date, there has been no means for performing searches within audio, image, or video content or providing targeted advertising for audio, image, or video content.

It would be desirable to be able to provide a search capability, indexing capability, and other functionality using a database that includes content extracted from audio, image, and video data. This would have the practical effect of making the content of audio, image, and video content searchable and able to be indexed and categorized for future use.

It would be desirable to be able to provide ads automatically along with particular audio, image, or video content that is related to the subject matter of the content. For example, if a user subscribes to a television program discussing stocks and bonds through a podcast service, it would be useful to be able to automatically provide ads for stock brokers along with the podcast. It further would be desirable to be able to provide such ads at particular times within the podcasts such that the ads are relevant to the content of the podcast at a particular time, such as immediately after a certain word is spoken in the podcast.

SUMMARY OF THE INVENTION

An apparatus and method for extracting the content of the audio, image, and video data, analyzing the content, and then providing a targeted advertisement, search capability, and/or other functionality based on the content is provided. One application of this invention is to provide targeted advertising that is provided in conjunction with audio, image, or video content over the Internet. Another application is to provide a search capability for audio, image, or video content.

One embodiment of the invention involves using a server to receive the audio content of a video or audio file or podcast. The server then performs a speech-to-text conversion on the audio and stores the extracted text in a database, in raw form and/or in various database fields. The server then receives a search inquiry from a network user. A search engine will run a search and will search within a database that includes the extracted audio data, and will provide a link to the audio data if relevant to the search entered. The server also may provide targeted advertising to the user based on the content that was extracted from the audio data, if relevant to the search entered.

Another embodiment of the invention involves using a server to download images or the video content of a video file or podcast. The server then performs image recognition to identify known images (e.g., a photograph of Abraham Lincoln), and stores those images and associated descriptive data in a database. The server then receives a search inquiry from a network user. A search engine will run a search and will search within a database that includes the podcast descriptive data and will provide a link to the image or video podcast if relevant to the search entered. The server also may provide targeted advertising to the user based on the descriptive data associated with the video podcast.

DETAILED DESCRIPTION OF THE PREFERRED EMBODIMENTS

Figure 1:
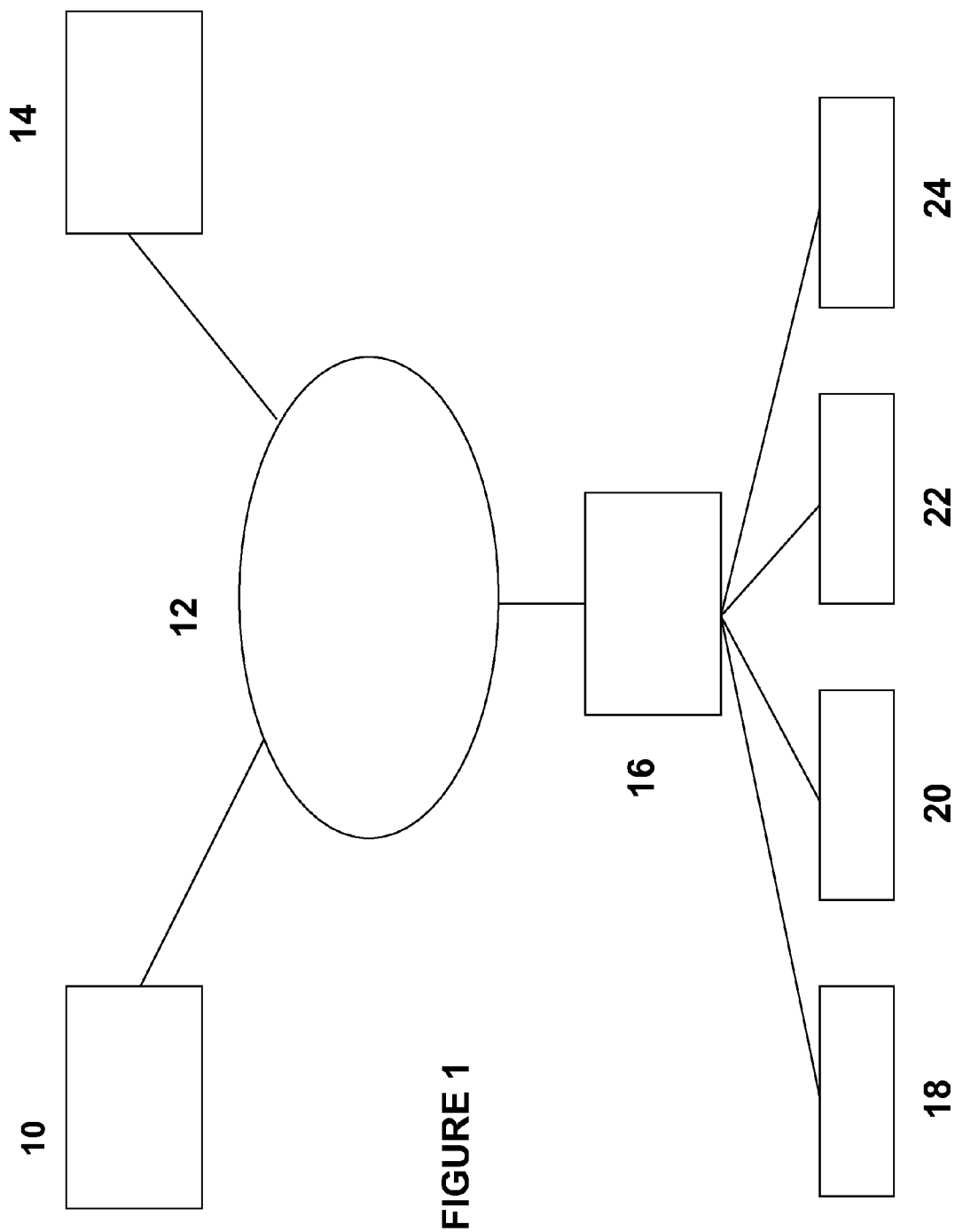
FIG. 1 is a diagram of the basic hardware system used in the preferred embodiment.

Embodiments implementing the present invention are described with reference to FIGS. 1-3. FIG. 1 shows the basic components of the hardware of one embodiment. Typically, a user will operate a computing device 10 to connect to a network 12, such as the Internet. Computing device 10 can be any device with a processor and memory, and includes PCs, laptops, mobile phones, PDAs, servers, etc. Computing device 10 preferably includes a display device and a media player. The connection to network 12 can be through any type of network connection, cellular network, mobile phone network, etc. The network 12 will connect a plurality of users and a plurality of servers and communicate data/content between the servers and the users. In one embodiment, Server A 14 will provide video, image, and/or audio content over the network 12, such as through a podcast or download to other computing devices connected to the network. Server B 16 will be able to access that content through the network 12. Server B 16 can include (or can be coupled to other devices containing) a database 18, storage device 20, search engine 22, and advertising engine 24. The database 18 typically comprises a database software program running on a server or other computer. The storage device 20 typically comprises magnetic or optical storage devices such as hard disk drives, RAID devices, DVD drives, or other storage devices. The storage device 20 typically stores the software run by the server and other associated computers as well as the underlying data and database structures for database 18. The search engine 22 typically comprises a software program running on a server or other computer that is capable of identifying relevant data records in database 18 based on a search request entered on computing device 10 by a user. The advertising engine 24 typically comprises a software program running on a server or other computer that is capable of identifying advertising data that is relevant to the search request entered on computing device 10. Database 18, storage device 20, search engine 22, and advertising engine 24 are well-known in the art and may all be contained on a single server (such as Server B 16) or on multiple servers.

Figure 2:
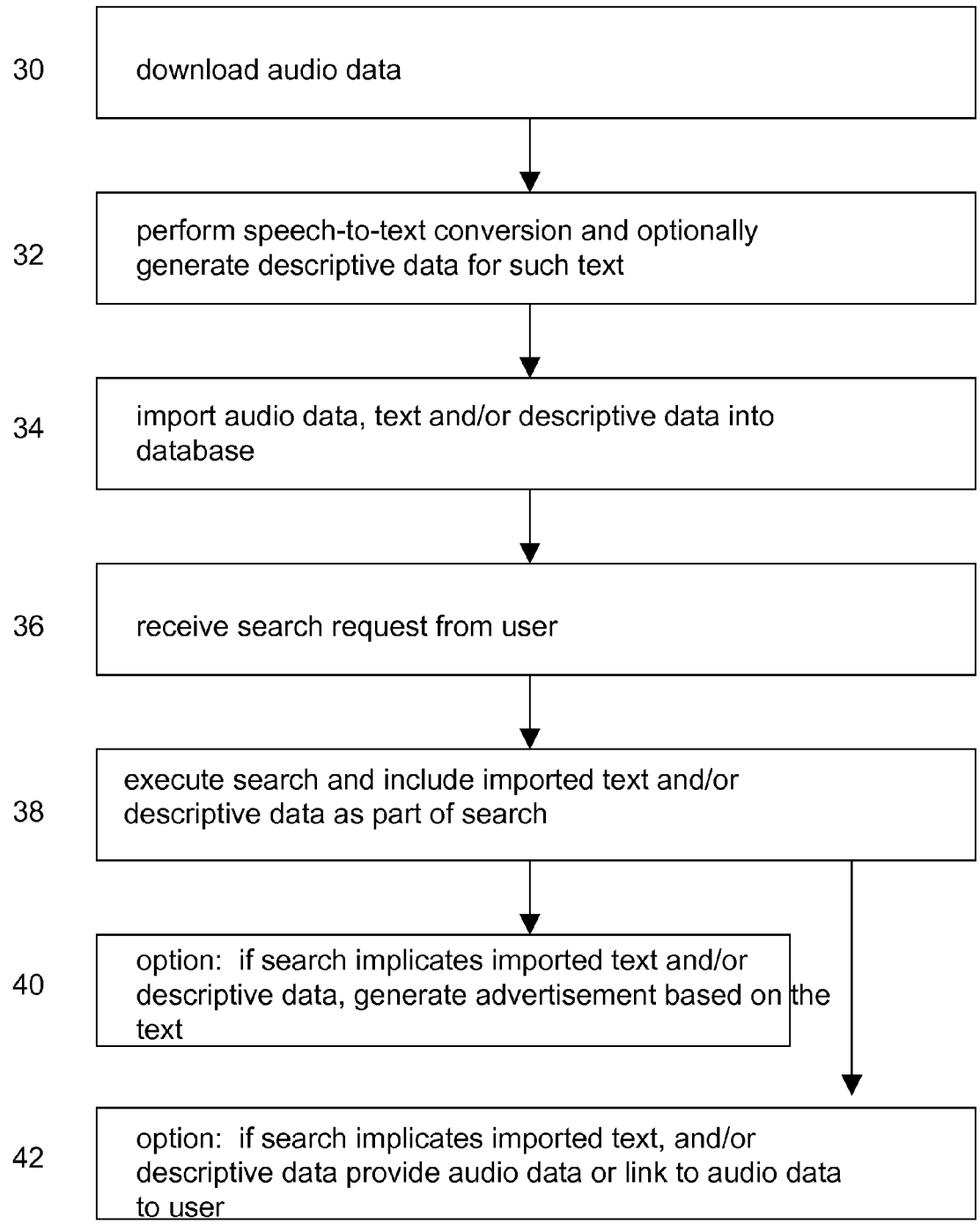
FIG. 2 is a flowchart of the basic method used in one embodiment for extracting text from and creating descriptive data for audio data.

FIG. 2 illustrates an embodiment relating to audio content or to the audio portion of a file or podcast that includes both video and audio. The method illustrated in FIG. 2 is preferably implemented on a server or other computing device. Server B 16 will first download the audio data offered by Server A 14 over the network 12 (step 30). Server B 16 will then automatically process the data, including the step of performing speech-to-text conversion on that audio data and/or creating descriptive data. (step 32). Speech-to-text conversion is well-known in the art. Creating descriptive data involves processing the text data to determine descriptive data that falls within certain predetermined database fields (e.g., a field indicating the general realm of the audio content, such as stock market information or movie news). Such processing essentially creates metadata that describes the content of the audio podcast. For instance, the database could include a field called "genre" that describes the general realm of the content. The entry that is placed into that field would be based on the content itself. As an example, if the extracted textual data includes the words "foreign policy" and "President," then an entry of "politics" could be placed in the genre field. That metadata would then be associated with that particular audio content. In this manner, audio content can be indexed (and later searched). The text, the descriptive data, and/or the audio data are imported into a database. (step 34).

Referring still to FIG. 2, a user will then input a search request (e.g., "lawnmowers") on computing device 10, such as through an Internet search engine run by Server B 16. That request will be received by Server B 16 over network 12 (step 36). Server B 16 and/or search engine 22 will then execute the search within the database 18 that includes the extracted textual data and/or descriptive metadata that previously was generated for the audio data (step 38). If the search implicates the extracted textual data or descriptive metadata, then server B 16 and/or advertising engine 24 optionally: (i) will identify a relevant advertisement based on the descriptive metadata, and that advertisement will be sent to computing device 10 for display (step 40), and/or (ii) will provide the audio data (which it previously obtained from server A 14 and stored) or a link to the audio data stored on server A 14 to the user (step 42). Server B 16 and/or advertising engine 24 optionally can format the advertisement to fit the display and graphics parameters of the display device of computing device 10 prior to transmitting the advertisement to computing device 10.

Figure 3:
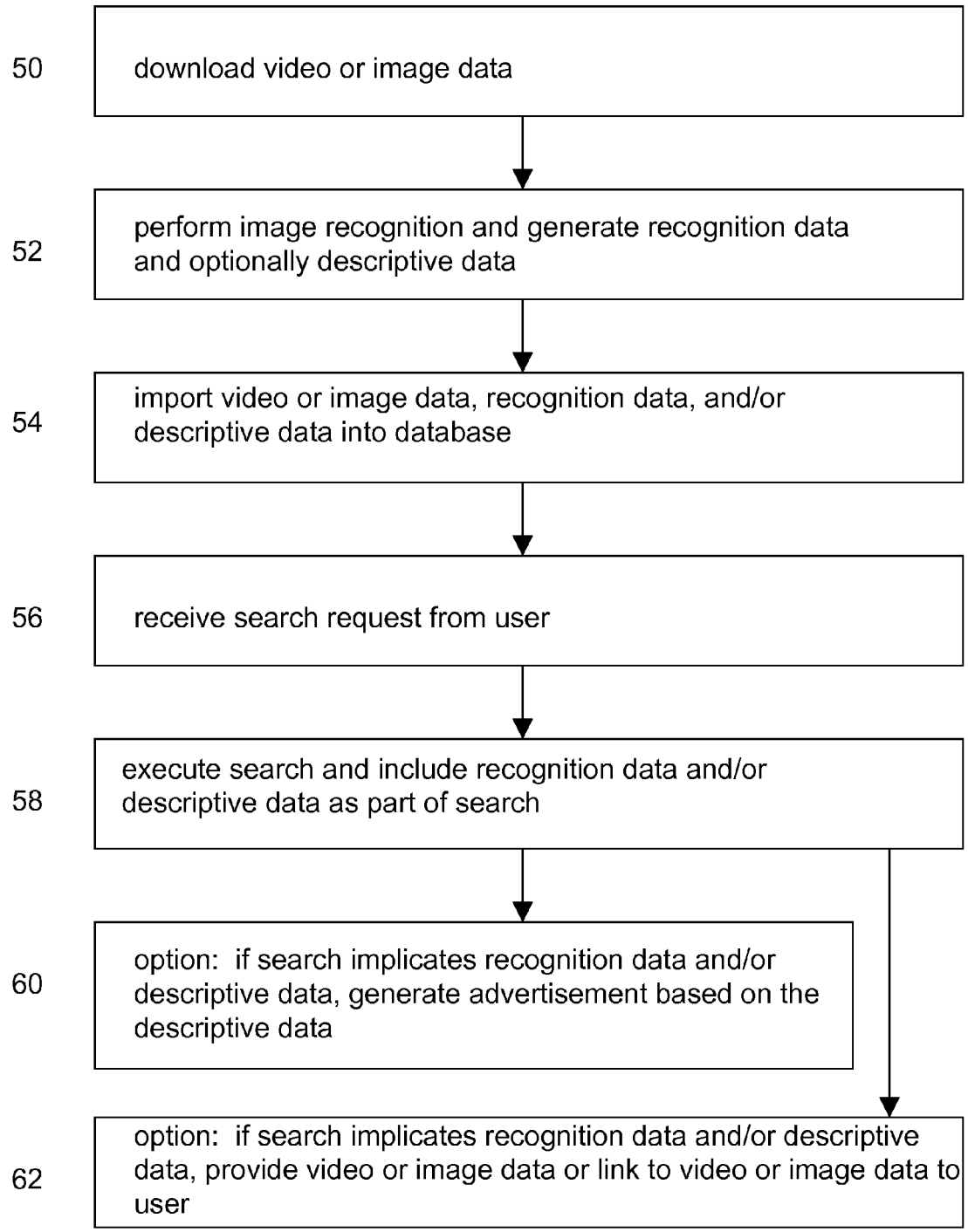
FIG. 3 is a flowchart of the basic method used in another embodiment for creating descriptive data for image data or video data.

FIG. 3 illustrates an embodiment that relates to images, video content, or to the video portion of a file or podcast that includes both video and audio. The method illustrated in FIG. 3 is preferably implemented on a server or other computing device. Server B 16 will first download the image data or video data offered by Server A 14 over the network 12 (step 50). Server B 16 will then automatically process the image data or video data, including the step of performing image recognition on that image or video data. (step 52). Image recognition involves comparing one or more frames of the video data to a set of previously stored, known images, such as images of famous politicians, pop icons, etc. Image recognition is well-known in the art. The step of image recognition will generate recognition data (e.g., the name of a famous politician that shows up in Frame X of the video data) (step 52). Server B will then import the image data, video data and/or the recognition data into database 18. The recognition data can be further processed and the resulting descriptive data and/or the recognition data itself stored in certain database fields (e.g., a field indicating the names of persons who appear in the video) (step 54). Steps 52 and 54 essentially create metadata that describes the content of the image or video data. For instance, the database could include a field called "genre" that describes the general realm of the content. The entry that is placed into that field would be based on the recognition data. As an example, if the recognition data includes "Abraham Lincoln" (because the prior step of image recognition had created that data based on an image in the video data) then an entry of "politics" could be placed in the genre field. The underlying image or video content will then be associated with the recognition data ("Abraham Lincoln") generated as a result of the image recognition step as well as descriptive data ("politics") generated through processing the recognition data. In this manner, video content can be indexed.

Referring again to FIG. 3, a user will then input a search request on computing device 10. That request will be received by Server B 16 over network 12 (step 56). Server B 16 and/or search engine 22 will then execute the search within the database 18 that includes the recognition data and/or descriptive data that previously was created for the video data (step 58). If the search implicates the recognition data and/or descriptive data, then server B 16 and/or advertising engine 24 optionally: (i) will generate an advertisement based on the recognition data and/or descriptive data, and that advertisement will be sent to computing device 10 for display (step 60), and/or (ii) will provide the image or video data (which it previously obtained from server A 14 and stored) or a link to the image or video data stored on server A 14 to the user (step 62).

With both audio and video downloads and podcasts, the timing of the advertisements can be synchronized with the audio and video content after the text data, descriptive data and/or recognition data has been created as discussed above. For example, if it has been determined that a certain video podcast contains a news segment on lawnmowers, an advertisement on lawnmowers can be integrated into the podcast to appear at the very moment when the news segment on lawnmowers begins, or even when the word "lawnmower" is spoken. Thus, after the user downloads the podcast and watches the news segment, the advertisement will appear on his or her screen at precisely the right moment. This is yet another benefit of converting audio, image, and video content into a text form that can be indexed, searched, and analyzed.

While the foregoing has been with reference to particular embodiments of the invention, it will be appreciated by those skilled in the art that changes in these embodiments may be made without departing from the principles and spirit of the invention, the scope of which is defined by the appended claims.

What is claimed is:

1. A system for providing targeted advertising with content that is one or more of video data, image data, and audio data in response to a request from a mobile device, the system comprising:
    a server comprising an advertising engine, wherein the server is configured to receive content and perform processing on the content to create descriptive data that describes a characteristic of the content, wherein the advertising engine is configured to associate an advertisement with the content based on the descriptive data;
    a mobile device comprising a display device, the mobile device configured to generate a request for the content; wherein the server is configured to receive the request and transmit the advertisement and the content to the mobile device over a network based on the request; and
    wherein the mobile device is configured to display or play the content and display or play the advertisement associated with the content.

2. The system of claim 1, wherein the content further comprises one of video data, image data and audio data.

3. The system of claim 2 wherein the audio data comprises a podcast.

4. The system of claim 1, wherein the mobile device comprises a mobile phone.

5. The system of claim 2, wherein the server is configured to perform speech to text processing of the audio data as part of creating the descriptive data.

6. The system of claim 2, wherein the server is configured to perform image recognition processing of the image data as part of creating the descriptive data.

7. The system of claim 2, wherein the server is configured to perform image recognition processing of the video data as part of creating the descriptive data.

8. The system of claim 2, wherein the mobile device is configured to synchronize the displaying or playing of the advertisement with the displaying or playing of related content within the video data, image data, or audio data.

9. The system of claim 5, wherein the mobile device is configured to synchronize the displaying or playing of the advertisement with the playing of related content within the audio data.

10. The system of claim 6, wherein the mobile device is configured to synchronize the displaying or playing of the advertisement with the displaying of related content within the image data.

11. The system of claim 7, wherein the mobile device is configured to synchronize the displaying or playing of the advertisement with the displaying or playing of related content within the video data.

12. A method for providing targeted advertising with content that is one or more of video data, image data, and audio data in response to a request from a mobile device, the method comprising:
    a server comprising an advertising engine receiving the content and performing processing on the content to create descriptive data that describes a characteristic of the content;
    the advertising engine associating an advertisement with the content based on the descriptive data;
    a mobile device comprising a display device generating the request;
    the server receiving the request and transmitting the advertisement and the content to the mobile device over a network based on the request; and
    the mobile device displaying or playing the content and displaying or playing the advertisement associated with the content.

13. The method of claim 12, wherein the content further comprises one of video data, image data and audio data.

14. The method of claim 13, wherein the audio data comprises a podcast.

15. The method of claim 12, wherein the mobile device comprises a mobile phone.

16. The method of claim 13, wherein the server performs speech to text processing of the audio data as part of creating the descriptive data.

17. The method of claim 13, wherein the server performs image recognition processing of the image data as part of creating the descriptive data.

18. The method of claim 13, wherein the server performs image recognition processing of the video data as part of creating the descriptive data.

19. The method of claim 13, wherein the mobile device synchronizes the displaying or playing of the advertisement with the displaying or playing of related content within the video data, image data, or audio data.

20. The method of claim 16, wherein the mobile device synchronizes the displaying or playing of the advertisement with the playing of related content within the audio data.

21. The method of claim 17, wherein the mobile device synchronizes the
    displaying or playing of the advertisement with the displaying of related content within the image data.

22. The method of claim 18, wherein the mobile device synchronizes the displaying or playing of the advertisement with the displaying or playing of related content within the video data.

23. A non-transitory computer readable medium having instructions to cause a system to perform the following actions:
    a server comprising an advertising engine receiving content and performing processing on the content to create descriptive data that describes a characteristic of the content;
    the advertising engine associating an advertisement with the content based on the descriptive data;

the server receiving the request from a mobile device and transmitting the advertisement and the content to the mobile device over a network based on the request;

wherein the mobile device comprises a display device; and the mobile device displaying or playing the content and displaying or playing the advertisement.

24. The medium of claim 23, wherein the content further comprises one of video data, image data and audio data.

25. The computer readable medium of claim 24, wherein the audio data comprises a podcast.

26. The computer readable medium of claim 23, wherein the mobile device comprises a mobile phone.

27. The computer readable medium of claim 24, wherein the computer readable medium has instructions to cause the server to perform speech to text processing of the audio data as part of creating the descriptive data.

28. The computer readable medium of claim 24, wherein the computer readable medium has instructions to cause the server to perform image recognition processing of the image data as part of creating the descriptive data.

29. The computer readable medium of claim 24, wherein the computer readable medium has instructions to cause the server to perform image recognition processing of the video data as part of creating the descriptive data.

30. The computer readable medium of claim 24, wherein the computer readable medium has instructions to synchronize the displaying or playing of the advertisement with the displaying or playing of related content within the video data, image data, or audio data.

31. The computer readable medium of claim 27, wherein the computer readable medium has instructions to synchronize the displaying or playing of the advertisement with the playing of related content within the audio data.

32. The computer readable medium of claim 28, wherein the computer readable medium has instructions to synchronize synchronizes the displaying or playing of the advertisement with the displaying of related content within the image data.

33. The computer readable medium of claim 29, wherein the computer readable medium has instructions to synchronize the displaying or playing of the advertisement with the displaying or playing of related content within the video data.

* * * * *